(12) United States Patent     (10) Patent No.:   US 12,662,600 B2

Lv et al.     (45) Date of Patent:   Jun. 23, 2026

---

(54) ABRASION-RESISTANT ANTI-CORROSIVE COATING, AND PREPARATION METHOD AND USE THEREOF

(71) Applicant: ELECTRIC POWER RESEARCH INSTITUTE OF GUANGDONG POWER GRID CO., LTD., Guangzhou (CN)

(72) Inventors: Wangyan Lv, Guangzhou (CN); Ming Nie, Guangzhou (CN); Feng Huang, Guangzhou (CN); Yingchao Yue, Guangzhou (CN)

(73) Assignee: ELECTRIC POWER RESEARCH INSTITUTE OF GUANGDONG POWER GRID CO., LTD., Guangzhou (CN)

( * ) Notice: Subject to any disclaimer, the term of this patent is extended or adjusted under 35 U.S.C. 154(b) by 824 days.

(21) Appl. No.: 17/907,982

(22) PCT Filed: Dec. 21, 2020

(86) PCT No.: PCT/CN2020/137942

§ 371 (c)(1),
(2) Date: Aug. 30, 2022

(87) PCT Pub. No.: WO2022/041594

PCT Pub. Date: Mar. 3, 2022

(65) Prior Publication Data

US 2023/0078879 A1     Mar. 16, 2023

(30) Foreign Application Priority Data

Aug. 26, 2020   (CN) ......................... 202010870983.X

(51) Int. Cl.
    C09D 5/08     (2006.01)
    C09D 7/40     (2018.01)
    (Continued)

(52) U.S. Cl.
    CPC ................. C09D 5/08 (2013.01); C09D 7/61 (2018.01); C09D 7/67 (2018.01); C09D 7/69 (2018.01); C09D 175/04 (2013.01)

(58) Field of Classification Search
    CPC ................................ C09D 5/08; C09D 175/04
    See application file for complete search history.

(56) References Cited

U.S. PATENT DOCUMENTS

2010/0163783 A1*   7/2010   Fung .................... C08G 59/304
                                                  252/73

FOREIGN PATENT DOCUMENTS

CN       102676029 A     9/2012
CN       110484116 A   * 11/2019  ............... C09D 7/70

OTHER PUBLICATIONS

Koleske et al. "Additives Handbook" (Year: 2011).*

(Continued)

*Primary Examiner* — Amber R Orlando
*Assistant Examiner* — Ryan Patrick Loughran

(57) ABSTRACT

Disclosed are an abrasion-resistant anti-corrosive coating, and a preparation method and a use thereof. The abrasion-resistant anti-corrosive coating is prepared from a component A and a component B. In the component A, a polyurethane (PU) resin is used as a film-forming material in combination with a corrosion inhibitor, an abrasion-resistant filler, and a body filler. On the basis of the abrasion resistance of the PU resin, the corrosion inhibition of the corrosion inhibitor and the high abrasion resistance of the abrasion-resistant filler improve the abrasion resistance of a coating layer. The use of the body filler reduces a cost of the coating. A thixotropic agent makes the coating have high storage stability. The coating does not include metal components, which avoids an electrochemical potential differ- (Continued)

ence between a coating layer and an alloy, such that the corrosion of the alloy can be effectively controlled.

2 Claims, 3 Drawing Sheets

(51) Int. Cl.
| | | |
|---|---|---|
| *C09D 7/61* | (2018.01) | |
| *C09D 175/04* | (2006.01) | |

(56) References Cited

OTHER PUBLICATIONS

Koleske et al. "Additives Handbook" 2011 (Year: 2011).*
Bayol et al. "The inhibitive effect of hexamethylenetetramine on the acid corrosion of steel" Materials Chemistry and Physics 2007 104(1) 74-82 (Year: 2007).*
Machine translation of CN-110484116-A (Year: 2019).*
Praw, "Polyurethane Polymers, Part 1" PCI Mag (Year: 2024).*
International Search Report of PCT Patent Application No. PCT/CN2020/137942 issued on Apr. 25, 2021.

* cited by examiner

ABRASION-RESISTANT ANTI-CORROSIVE COATING, AND PREPARATION METHOD AND USE THEREOF

The present application claims priority to Chinese Patent Application No. 202010870983.X filed to the China National Intellectual Property Administration (CNIPA) on Aug. 26, 2020 and entitled "ABRASION-RESISTANT ANTI-CORROSIVE COATING, AND PREPARATION METHOD AND USE THEREOF", which is incorporated herein by reference in its entirety.

TECHNICAL FIELD

The present disclosure relates to the technical field of coatings, and in particular to an abrasion-resistant anti-corrosive coating, and a preparation method and a use thereof.

BACKGROUND

Magnesium and alloys thereof are the lightest engineering metal materials, and have advantages such as high specific strength, easy casting and recycling, low toxicity, no magnetism, and prominent plastic deformation energy absorption, high thermal conductivity, low thermal capacity, and electrical shielding performance. Therefore, the magnesium and alloys thereof have potential application prospects in industrial fields such as automotives, electronics, aviation, aerospace, energy, and biomedicine. However, in most environments such as humid atmospheres, sea water, simulated body fluids (SBFs), engine cooling fluids, and other corrosive environments, the application of magnesium and alloys thereof is strictly limited by their high corrosion susceptibility. The high corrosion susceptibility of magnesium and alloys thereof is attributed to their very negative standard potentials and surface film porosity, which results in little protection for magnesium and alloys thereof. Therefore, the poor corrosion resistance of magnesium alloys has always been a key problem restricting the wide application of magnesium alloys.

Magnesium alloys have low hardness and thus are prone to surface damage such as scratches during use, which further accelerates the corrosion of magnesium alloys. Therefore, the poor abrasion resistance of magnesium alloys is another factor restricting the large-scale application of magnesium alloys.

Common treatment processes for improving the corrosion resistance of magnesium alloys include chemical conversion coatings, Ni-based coatings, Cr-based coatings, NiP-based coatings, and other coating technologies. However, a chemical conversion coating can only be used as a bottom layer of a coating, and cannot improve the abrasion resistance of magnesium alloys. Although the coating technologies can improve the abrasion resistance of magnesium alloys to some extent, there is a huge potential difference between a coating material and a magnesium alloy matrix, and defects in a coating can easily cause and accelerate the corrosion of magnesium alloys. Therefore, none of these processes can effectively improve the abrasion resistance and corrosion resistance of magnesium alloys.

SUMMARY

In view of this, the present disclosure provides an abrasion-resistant anti-corrosive coating, and a preparation method and a use thereof. The abrasion-resistant anti-corrosive coating can effectively improve the abrasion resistance and corrosion resistance of a magnesium alloy.

The specific technical solutions are as follows:

The present disclosure provides an abrasion-resistant anti-corrosive coating, which is prepared from a component A and a component B, where in parts by weight, the component A includes:

polyurethane (PU) resin: 10 to 60 parts;

abrasion-resistant filler: 1 to 60 parts;

thixotropic agent: 0.5 to 1 part;

body filler: 5 to 15 parts;

corrosion inhibitor: 0.5 to 2 parts; and solvent: 20 to 80 parts;

the component B includes a curing agent; and a mass ratio of the component A to the component B is 1:(1-2).

In the component A of the abrasion-resistant anti-corrosive coating provided by the present disclosure, a PU resin is used as a film-forming material in combination with a corrosion inhibitor, an abrasion-resistant filler, and a body filler. On the basis of the abrasion resistance of the PU resin, the abrasion resistance of a coating layer is improved through the corrosion inhibition effect of the corrosion inhibitor and the high abrasion resistance of the abrasion-resistant filler. The use of the body filler reduces a cost of the coating. A thixotropic agent makes the coating have high storage stability. The coating does not include any metal component, which avoids an electrochemical potential difference between the coating layer and an alloy, such that the corrosion of the alloy can be effectively controlled. The components of the coating of the present disclosure cooperate with each other to provide a synergistic effect, such that the coating exhibits excellent comprehensive performance.

In the present disclosure, the abrasion-resistant filler may be silicon nitride and/or boron nitride;

the thixotropic agent may be lipophilic fumed silica;

the body filler may be mica and/or ground calcium carbonate (GCC);

the corrosion inhibitor may be N-nitrosophenylhydroxylamine and/or hexamethylenetetramine (HMTA); and the solvent may be selected from the group consisting of X-10, xylene, and ethylene glycol monoethyl ether acetate.

In the present disclosure, the PU coating has excellent abrasion resistance, weather resistance, flexibility, and water resistance. The high-hardness filler can greatly improve the abrasion resistance of a coating layer; and the N-nitrosophenylhydroxylamine and/or HMTA are/is used as a corrosion inhibitor, which can significantly improve the corrosion resistance of a coating layer. The mica and/or GCC are/is used as a body filler to improve the compactness of the coating and reduce the cost of the coating; and the lipophilic fumed silica is used as a thixotropic agent to make the coating have high storage stability.

In the present disclosure, the curing agent may be a modified alkyd resin.

In the present disclosure, the silicon nitride and the boron nitride may each have a particle size of 1 μm to 20 μm and preferably 1 μm, 10 μm, 15 μm, or 20 μm;

the lipophilic fumed silica may have a particle size of 20 nm to 100 nm and preferably 20 nm, 30 nm, 50 nm, or 100 nm; and the mica or the GCC may have a particle size of 2 μm to 30 μm and preferably 2 μm, 5 μm, 10 μm, 12 μm, 15 μm, 25 μm, or 20 μm.

The present disclosure also provides a preparation method of the abrasion-resistant anti-corrosive coating, including the following steps:

1) preparation of the component A: thoroughly mixing the PU resin, the abrasion-resistant filler, the thixotropic agent, the body filler, the corrosion inhibitor, and the solvent, and grinding a resulting mixture for dispersion to obtain the component A; and 2) mixing the component A with the component B, and thoroughly stirring a resulting mixture to obtain the abrasion-resistant anti-corrosive coating.

The preparation method of the abrasion-resistant anti-corrosive coating provided by the present disclosure is simple, easy to operate, and suitable for industrial production.

In step 1 of the present disclosure, the PU resin, the abrasion-resistant filler, the thixotropic agent, the body filler, the corrosion inhibitor, and the solvent are thoroughly mixed, wetted, and ground for dispersion. The grinding for dispersion may be conducted specifically as follows: 0.5 mm to 2 mm grinding beads are placed in a stirring and grinding machine to conduct the grinding at a rotational speed of 1,500 rpm to 3,000 rpm for 30 min to 60 min.

The component A may preferably be passed through a 120 to 300-mesh sieve such that the component A has a fineness degree of 10 $\mu$m to 30 $\mu$m, preferably 20 $\mu$m to 30 $\mu$m, and more preferably 20 $\mu$m; and then the component A may be mixed with the component B.

The present disclosure also provides a use of the abrasion-resistant anti-corrosive coating described above in the preparation of a coating layer for a steel material, aluminum alloy, titanium alloy, and/or magnesium alloy component and preferably a coating layer for a magnesium alloy component.

The present disclosure allows steel materials, aluminum alloys, titanium alloys, and magnesium alloys to be used in the fields of automobiles, electronics, electric power, aviation, and the like.

In the present disclosure, a coating layer may preferably be applied to a surface of a magnesium alloy component undergoing a sand-blasting or polishing treatment through spray-coating, brush-coating, or dip-coating, where a first anti-corrosive coating layer is applied at a thickness of 10 $\mu$m to 50 $\mu$m, and one or more coating layers can be applied as required, with two adjacent layers being applied at an interval of 10 min to 20 min; and then a resulting coating layer was cured for 24 h or more in a clean room-temperature environment to obtain an abrasion-resistant anti-corrosive coating layer.

It can be seen from the above technical solutions that the present disclosure has the following advantages:

The present disclosure provides an abrasion-resistant anti-corrosive coating. In the component A of the coating, a PU resin is used as a film-forming material in combination with a corrosion inhibitor, an abrasion-resistant filler, and a body filler. On the basis of the abrasion resistance of the PU resin, the corrosion inhibition of the corrosion inhibitor and the high abrasion resistance of the abrasion-resistant filler improve the abrasion resistance of a coating layer. The use of the body filler reduces a cost of the coating. A thixotropic agent makes the coating have high storage stability. The coating does not include metal components, which avoids an electrochemical potential difference between a coating layer and an alloy, such that the corrosion of the alloy can be effectively controlled. The components of the coating of the present disclosure cooperate with each other to play a synergistic effect, such that the coating exhibits excellent comprehensive performance.

BRIEF DESCRIPTION OF THE DRAWINGS

To describe the technical solutions in the examples of the present disclosure or in the prior art more clearly, the accompanying drawings required for describing the examples or the prior art will be briefly described below. Apparently, the accompanying drawings in the following description show merely some examples of the present disclosure, and those of ordinary skill in the art may still derive other drawings from these accompanying drawings without creative efforts.

DETAILED DESCRIPTION

In order to make the objectives, features, and advantages of the present disclosure more comprehensible, the technical solutions in the examples of the present disclosure will be clearly and completely described below. Apparently, the examples described below are merely some rather than all of the examples of the present disclosure. All other examples obtained by those of ordinary skill in the art based on the examples of the present disclosure without creative efforts should fall within the protection scope of the present disclosure.

In the examples of the present disclosure, the PU resin and the curing agent are from a TS01-3 two-component PU coating of the Tianjin Lighthouse Coatings Industry Development Co., Ltd.; and the X-10 solvent is purchased from the Tianjin Lighthouse Coatings Industry Development Co., Ltd., and the X-10 solvent is a mixed solvent composed of 60 parts of anhydrous toluene, 25 parts of butyl acetate, and 15 parts of cyclohexanone.

EXAMPLE 1

In this example, in parts by mass, 20 parts of silicon nitride powder with a particle size of 10 $\mu$m, 0.8 part of fumed silica with a particle size of 20 nm, 10 parts of muscovite mica powder with a particle size of 12 $\mu$m, and 0.9 part of N-nitrosophenylhydroxylamine were weighed and sequentially added to 30 parts of PU resin, then 30 parts of an X-10 solvent were weighed and added, and a resulting mixture was thoroughly stirred, then put into a stirring and grinding machine together with 50 parts of grinding beads having a particle size of 1 mm, ground at 2,000 rpm for 40 min, and then taken out and filtered through a 120-mesh stainless steel mesh to obtain a component A of 10 μm to 30 μm; and 15 parts of modified alkyd resin (curing agent, component B) were weighed and thoroughly mixed with the component A (a mass ratio of the component A to the component B was 1:(1-2)) to obtain an abrasion-resistant anti-corrosive coating.

The abrasion-resistant anti-corrosive coating was spray-coated on a surface of a sand-blasted magnesium alloy AZ91D for a first time, then the surface was dried for 15 min, the abrasion-resistant anti-corrosive coating was spray-coated for a second time, and a resulting sample was cured for 24 h in a dry room-temperature environment to obtain an abrasion-resistant anti-corrosive coating layer with a thickness of 65 μm.

Figure 1:
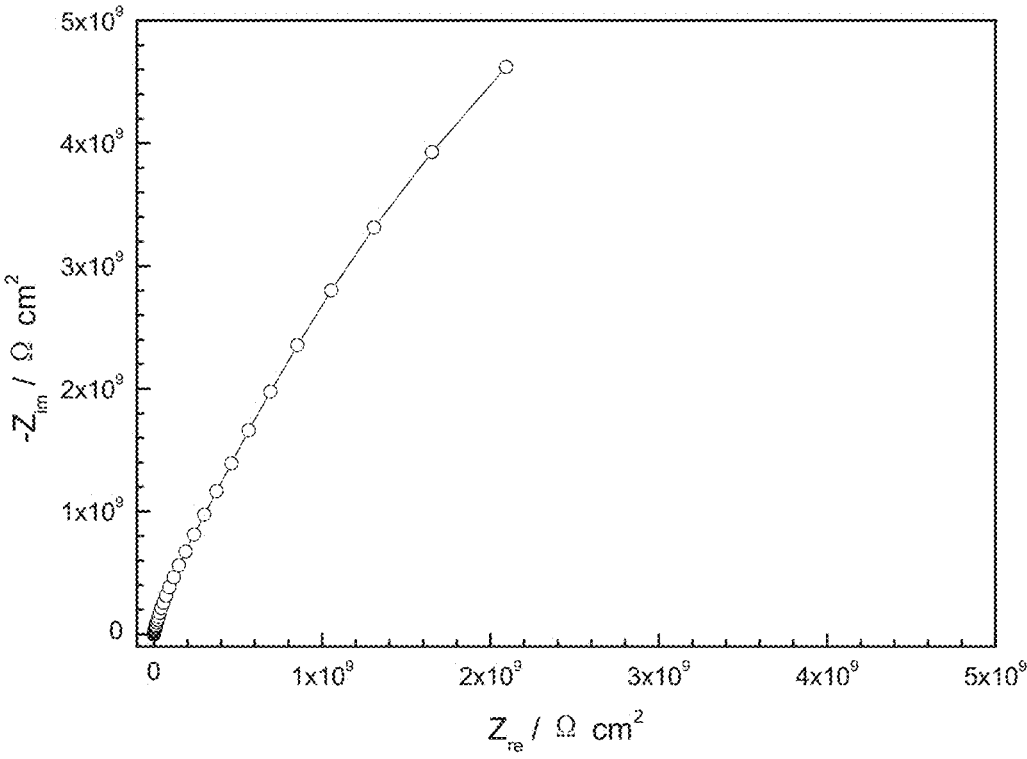
FIG. 1 is an electrochemical impedance spectroscopy (EIS) spectrum of the magnesium alloy AZ91D with an abrasion-resistant anti-corrosive coating layer in Example 1 of the present disclosure after being soaked in a 3.5% NaCl solution for 3,000 h.

In this example, performance parameters of the abrasion-resistant anti-corrosive coating layer were as follows:

The magnesium alloy AZ91D with the abrasion-resistant anti-corrosive coating layer was soaked in a 3.5% NaCl solution for 3,000 h. As shown in FIG. 1, after the soaking, an impedance of the coating layer was remained at $10^9$ $\Omega cm^2$, indicating that the coating layer in this example exhibited excellent corrosion resistance.

Figure 2:
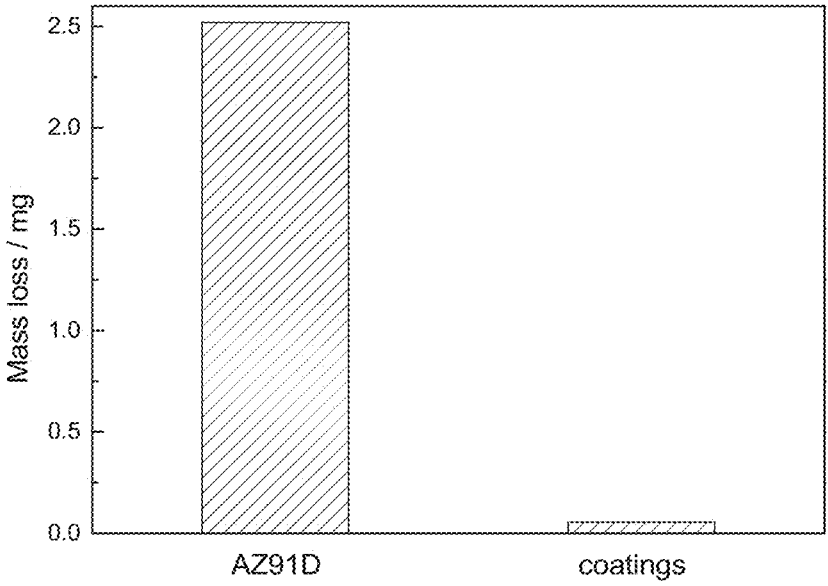
FIG. 2 shows a mass loss of the magnesium alloy AZ91D with an abrasion-resistant anti-corrosive coating layer in Example 1 of the present disclosure.

As shown in FIG. 2, a mass loss of the magnesium alloy with the coating layer after being abraded for 30 min under a load of 1,000 g was 47 times lower than that of the magnesium alloy AZ91D, indicating that the coating layer in this example exhibited excellent abrasion resistance.

COMPARATIVE EXAMPLE 1

In this comparative example, a coating was prepared by the same process as in Example 1, except that a zinc powder was used as the corrosion inhibitor and an alumina powder was used as the abrasion-resistant filler. The coating was coated on a surface of a magnesium alloy AZ91D to obtain a coating layer. Since the higher potential of zinc than the magnesium alloy AZ91D promoted the corrosion of the magnesium alloy, after the coating layer was soaked for 520 h, an impedance of the coating layer dropped to $10^5$ $\Omega cm^2$, indicating that the coating layer lost its protective effect. Under the same friction and abrasion conditions, a mass loss of the magnesium alloy with the coating layer was only 15 times lower than that of the magnesium alloy AZ91D.

EXAMPLE 2

In this example, in parts by mass, 30 parts of boron nitride powder with a particle size of 15 μm, 1 part of fumed silica with a particle size of 50 nm, 8 parts of GCC with a particle size of 25 μm, and 1.5 parts of HMTA were weighed and sequentially added to 50 parts of PU resin, then 35 parts of xylene were weighed and added, and a resulting mixture was thoroughly stirred, then put into a stirring and grinding machine together with 60 parts of grinding beads having a particle size of 2 mm, ground at 3,000 rpm for 30 min, and then taken out and filtered through a 300-mesh stainless steel mesh to obtain a component A of 10 μm to 30 μm; and 25 parts of a curing agent (component B) were weighed and thoroughly mixed with the component A (a mass ratio of the component A to the component B was 1:(1-2)) to obtain an abrasion-resistant anti-corrosive coating.

The abrasion-resistant anti-corrosive coating was spray-coated on a surface of a sand-blasted magnesium alloy AZ31 for a first time, then the surface was dried for 10 min, the abrasion-resistant anti-corrosive coating was spray-coated for a second time, and a resulting sample was cured for 24 h in a dry room-temperature environment to obtain an abrasion-resistant anti-corrosive coating layer with a thickness of 70 μm.

Figure 3:
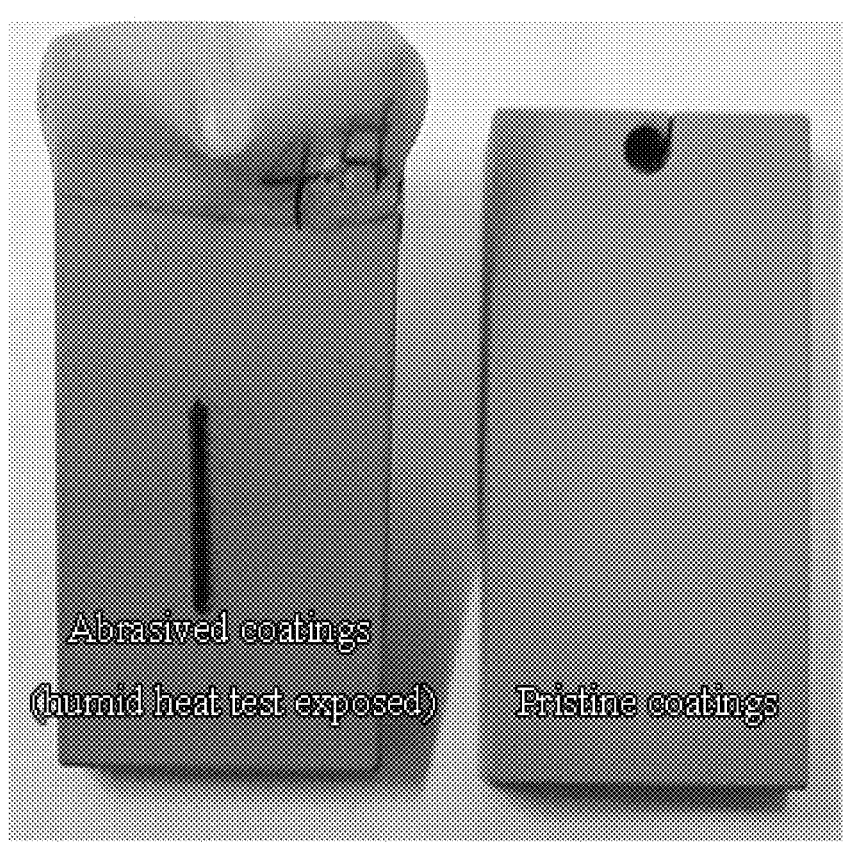
FIG. 3 shows macroscopic morphologies of the magnesium alloy AZ31 with an abrasion-resistant anti-corrosive coating layer in Example 2 of the present disclosure that undergoes humid heat corrosion for 1,000 h, where the left panel shows a macroscopic morphology of the sample undergoing a humid heat test for 1,000 h (GJB 150.9A-2009), and the right panel shows the original morphology of a coating layer.

In this example, performance parameters of the abrasion-resistant anti-corrosive coating layer were as follows:

The magnesium alloy AZ31 with the abrasion-resistant anti-corrosive coating layer was subjected to a humid heat corrosion test for 1,000 h. As shown in FIG. 3, after the 1,000 h of test, the coating layer was intact, and did not undergo damage such as blistering and peeling.

COMPARATIVE EXAMPLE 2

In this comparative example, a coating was prepared by the same process as in Example 2, except that a polyamide (PA) powder with a molecular weight of 19,000 was used as the thixotropic agent. The coating was coated on a surface of a magnesium alloy AZ31 to obtain a coating layer. Due to the poor compatibility of PA with the coating, the coating layer had many pores. After undergoing humid heat corrosion for 830 h, the coating layer had blisters and exhibited reduced protection performance.

EXAMPLE 3

In this example, in parts by mass, 10 parts of silicon nitride powder with a particle size of 20 μm, 15 parts of boron nitride powder with a particle size of 15 μm, 1.2 parts of fumed silica with a particle size of 100 nm, 5 parts of muscovite mica powder with a particle size of 2 μm, 7 parts of GCC with a particle size of 20 μm, 0.8 part of N-nitroso-phenylhydroxylamine, and 1 part of HMTA were weighed and sequentially added to 60 parts of PU resin, then 40 parts of an X-10 diluent and 40 parts of xylene were weighed and added, and a resulting mixture was thoroughly stirred, then put into a stirring and grinding machine together with 80 parts of grinding beads having a particle size of 0.5 mm, ground at 1,500 rpm for 60 min, and then taken out and filtered through a 120-mesh stainless steel mesh to obtain a component A of 10 μm to 30 μm; and 30 parts of a curing agent (component B) were weighed and thoroughly mixed with the component A (a mass ratio of the component A to the component B was 1:(1-2)) to obtain an abrasion-resistant anti-corrosive coating. The abrasion-resistant anti-corrosive coating was spray-coated on a surface of a sand-blasted magnesium alloy ME20M for a first time, then the surface was dried for 20 min, the abrasion-resistant anti-corrosive coating was spray-coated for a second time, and a resulting sample was cured for 24 h in a dry room-temperature environment to obtain an abrasion-resistant anti-corrosive coating layer with a thickness of 75 μm.

Figure 4:
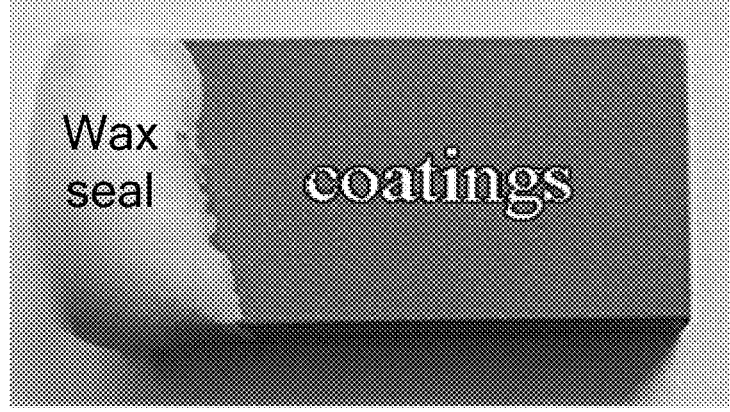
FIG. 4 shows a macroscopic morphology of a magnesium alloy ME20M with an abrasion-resistant anti-corrosive coating layer in Example 4 of the present disclosure that undergoes neutral salt spray corrosion for 2,000 h (GJB 150.11A-2009)

In this example, performance parameters of the abrasion-resistant anti-corrosive coating layer were as follows:

The magnesium alloy ME20M with the abrasion-resistant anti-corrosive coating layer was subjected to neutral salt spray corrosion for 2,000 h, and as shown in FIG. 4, the coating layer underwent no blistering, peeling, and cracking, indicating that the coating layer had excellent salt spray corrosion resistance.

COMPARATIVE EXAMPLE 3

In this comparative example, a coating was prepared by the same process as in Example 3, except that kaolin was used as the body filler. The coating was coated on a surface of a magnesium alloy ME20M to obtain a coating layer, and the magnesium alloy with the coating layer was subjected to salt spray corrosion for 560 h. Because the kaolin had a high iron content and thus easily corroded the magnesium alloy, the magnesium alloy matrix was corroded after the salt spray corrosion.

EXAMPLE 4

In this example, in parts by mass, 60 parts of silicon nitride powder with a particle size of 20 μm, 0.6 part of fumed silica with a particle size of 30 nm, 10 parts of muscovite mica powder with a particle size of 5 μm, 5 parts of GCC with a particle size of 10 μm, 0.1 part of N-nitroso-phenylhydroxylamine, and 0.7 part of HMTA were weighed and sequentially added to 40 parts of PU resin, then 40 parts of the diluent ethylene glycol monoethyl ether acetate were weighed and added, and a resulting mixture was thoroughly stirred, then put into a stirring and grinding machine together with 60 parts of grinding beads having a particle size of 1 mm, ground at 2,500 rpm for 50 min, and then taken out and filtered through a 220-mesh stainless steel mesh to obtain a component A of 10 μm to 30 μm; and 40 parts of a curing agent (component B) were weighed and thoroughly mixed with the component A (a mass ratio of the component A to the component B was 1:(1-2)) to obtain an abrasion-resistant anti-corrosive coating. The abrasion-resistant anti-corrosive coating was spray-coated on a surface of a sand-blasted magnesium alloy AZ91D for a first time, then the surface was dried for 12 min, the abrasion-resistant anti-corrosive coating was spray-coated for a second time, and a resulting sample was cured for 24 h in a dry room-temperature environment to obtain an abrasion-resistant anti-corrosive coating layer with a thickness of 60 μm.

Figure 5:
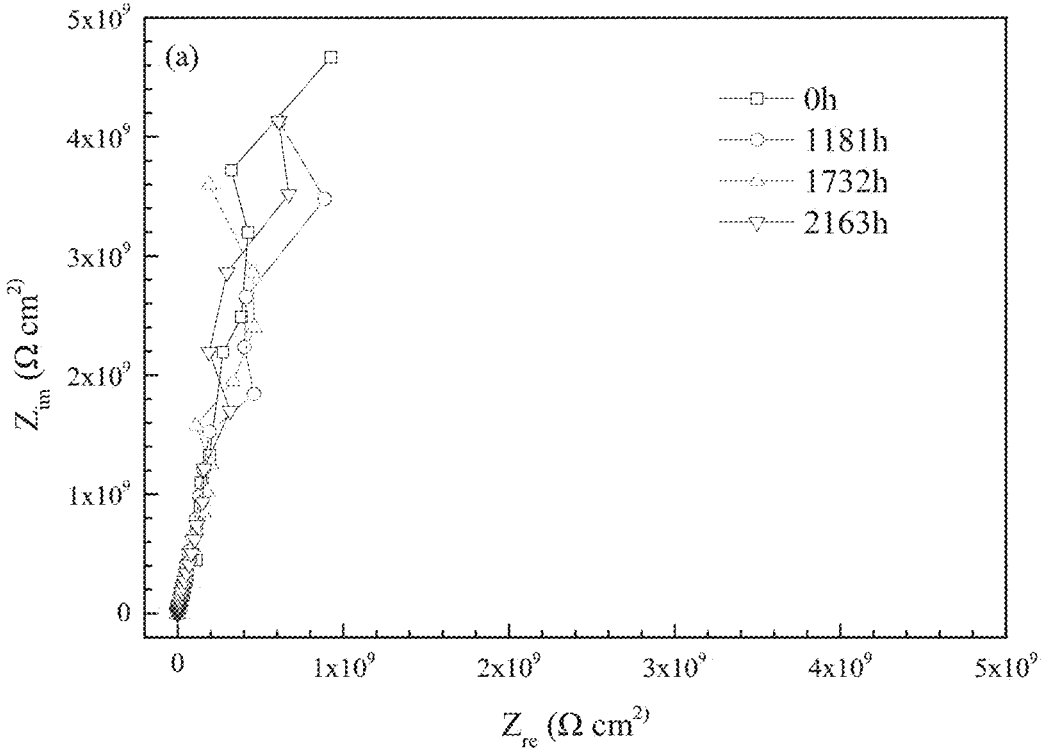
FIG. 5 shows EIS spectra of a magnesium alloy AZ91D with an abrasion-resistant anti-corrosive coating layer in Example 5 of the present disclosure when soaked in a 10% HCl solution.

In this example, performance parameters of the abrasion-resistant anti-corrosive coating layer were as follows:

After the magnesium alloy AZ91D with the abrasion-resistant anti-corrosive coating layer was soaked in a 10% HCl solution for 2,163 h, the coating layer did not undergo blistering, peeling, and cracking, and as shown in FIG. 5, an impedance of the coating layer remained at $10^9$ $\Omega cm^2$, indicating that the coating layer exhibited excellent acid corrosion resistance.

COMPARATIVE EXAMPLE 4

In this comparative example, a coating was prepared by the same process as in Example 4, except that a ferrophos-phorus powder was used as the corrosion inhibitor. The coating was coated on a surface of a magnesium alloy AZ91D, and the magnesium alloy with a coating layer was soaked in a 10% HCl solution for 843 h. After the soaking, the magnesium alloy matrix was corroded.

EXAMPLE 5

In this example, in parts by mass, 5 parts of silicon nitride powder with a particle size of 1 μm, 0.7 part of fumed silica with a particle size of 20 nm, 5 parts of muscovite mica powder with a particle size of 15 μm, 0.2 part of N-nitroso-phenylhydroxylamine, and 1.2 parts of HMTA were weighed and sequentially added to 15 parts of PU resin, then 35 parts of xylene were weighed and added, and a resulting mixture was thoroughly stirred, then put into a stirring and grinding machine together with 25 parts of grinding beads having a particle size of 0.8 mm, ground at 1800 rpm for 40 min, and then taken out and filtered through a 150-mesh stainless steel mesh to obtain a component A of 10 μm to 30 μm; and 10 parts of a curing agent (component B) were weighed and thoroughly mixed with the component A (a mass ratio of the component A to the component B was 1:(1-2)) to obtain an abrasion-resistant anti-corrosive coating. The abrasion-resistant anti-corrosive coating was spray-coated on a surface of a sand-blasted magnesium alloy AZ31 for a first time, then the surface was dried for 13 min, the abrasion-resistant anti-corrosive coating was spray-coated for a second time, and a resulting sample was cured for 24 h in a dry room-temperature environment to obtain an abrasion-resistant anti-corrosive coating layer with a thickness of 80 μm.

In this example, performance parameters of the abrasion-resistant anti-corrosive coating layer were as follows:

The magnesium alloy AZ31 with the abrasion-resistant anti-corrosive coating layer was subjected to a friction and abrasion test under a load of 1,000 g for 30 min, and after the friction and abrasion test, a mass loss of the magnesium alloy with the coating layer was 52 times lower than that of the magnesium alloy AZ31. The magnesium alloy was soaked in artificial sea water for 2,000 h, and after the soaking, the coating layer did not undergo damage such as blistering, peeling, and cracking and still could play a prominent protective role, such that the magnesium alloy below the coating layer was not corroded.

COMPARATIVE EXAMPLE 5

In this comparative example, a coating was prepared by the same process as in Example 5, except that 90 parts of PU resin were used in the component A. The coating was coated on a surface of a magnesium alloy AZ31. Then the magnesium alloy with a coating layer was subjected to a friction and abrasion test, and after the friction and abrasion test, a mass loss of the magnesium alloy with the coating layer was only 13 times lower than that of the magnesium alloy AZ31. The magnesium alloy with the coating layer was soaked in artificial sea water for 796 h, and after the soaking, the magnesium alloy matrix was corroded.

The results of the examples show that an abrasion-resistant anti-corrosive coating layer of a magnesium alloy obtained by the process significantly improves the abrasion resistance and corrosion resistance of the magnesium alloy, and the process is easy to control and is suitable for industrial production.

The above examples are used only to describe the technical solutions of the present disclosure, and are not intended to limit the present disclosure. Although the present disclosure is described in detail with reference to the above examples, those of ordinary skill in the art should understand that they can still modify the technical solutions described in the above examples, or make equivalent substitutions to some technical features therein. These modifications or substitutions do not make the essence of the corresponding technical solutions depart from the spirit and scope of the technical solutions of the examples of the present disclosure.

The invention claimed is:

1. An abrasion-resistant anti-corrosive coating made from a component A and a component B,
   wherein in parts by weight, the component A comprises:
   polyurethane resin: 10 to 60 parts;
   abrasion-resistant filler: 1 to 60 parts;
   thixotropic agent: 0.5 to 1 part;
   body filler: 5 to 15 parts;
   corrosion inhibitor: 0.5 to 2 parts; and solvent: 20 to 80 parts;

the component B comprises a curing agent;

a mass ratio of the component A to the component B is 1:(1-2);

wherein the abrasion-resistant filler is silicon nitride and/ or boron nitride;

the thixotropic agent is lipophilic fumed silica;

the body filler is mica and/or ground calcium carbonate;

the corrosion inhibitor is N-nitrosophenylhydroxylamine;

the solvent is selected from the group consisting of X-10, xylene, and ethylene glycol monoethyl ether acetate; and the curing agent is a modified alkyd resin.

2. The abrasion-resistant anti-corrosive coating according to claim 1, wherein the silicon nitride and the boron nitride each have a particle size of 1 μm to 20 μm;

the lipophilic fumed silica has a particle size of 20 nm to 100 nm; and the mica or the ground calcium carbonate has a particle size of 2 μm to 30 μm.

\*    \*    \*    \*    \*